(12) United States Patent  (10) Patent No.: US 9,344,169 B2
Liu et al.  (45) Date of Patent: May 17, 2016

(54) SIGNAL TRANSMISSION METHOD, SYSTEM, AND DEVICE

(71) Applicant: Huawei Technologies Co., Ltd., Shenzhen, Guangdong (CN)

(72) Inventors: Sheng Liu, Shenzhen (CN); Rui Wang, Shenzhen (CN); Rongdao Yu, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 3 days.

(21) Appl. No.: 14/689,402

(22) Filed: Apr. 17, 2015

(65) Prior Publication Data

US 2015/0222342 A1  Aug. 6, 2015

Related U.S. Application Data

(63) Continuation of application No. PCT/CN2013/076154, filed on May 23, 2013.

(30) Foreign Application Priority Data

Oct. 19, 2012  (CN) .......................... 2012 1 0401050

(51) Int. Cl.
  *H04B 7/04*  (2006.01)
  *H04B 7/02*  (2006.01)
  (Continued)

(52) U.S. Cl.
  CPC .............. *H04B 7/0456* (2013.01); *H04B 7/024* (2013.01); *H04B 7/0404* (2013.01); *H04B 7/0413* (2013.01); *H04B 7/0617* (2013.01); *H04L 1/00* (2013.01); *H04B 7/0452* (2013.01)

(58) Field of Classification Search
  CPC ............................ H04B 7/0617; H04B 7/0452
  See application file for complete search history.

(56) References Cited

U.S. PATENT DOCUMENTS

2003/0095588 A1  5/2003  Yellin et al.
2010/0272014 A1  10/2010  Orlik et al.
(Continued)

FOREIGN PATENT DOCUMENTS

CN  101944943 A  1/2011
CN  102316505 A  1/2012
(Continued)

OTHER PUBLICATIONS

"Simulation considerations on distributed RRHs for COMP", Motorola, 3GPP TSG RAN1#64, Feb. 21-25, 2011, 3 pages.
(Continued)

*Primary Examiner* — Ross Varndell

(57) ABSTRACT

The present invention provides a signal transmission method, system, and device, where the method includes: setting K virtual users, where each virtual user is associated with one base station; obtaining base station precode and user precode corresponding to each of the K virtual users; splitting a baseband signal to the K virtual users, and obtaining a split baseband signal corresponding to each of the K virtual users; processing, according to the base station precode and the user precode corresponding to each virtual user, the split baseband signal corresponding to each virtual user, and obtaining an uplink signal corresponding to each virtual user; and obtaining timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmitting, through an antenna, the uplink signal corresponding to the virtual user to the base station corresponding to each virtual user.

19 Claims, 10 Drawing Sheets

(51) Int. Cl.
*H04B 7/06* (2006.01)
*H04L 1/00* (2006.01)

(56) References Cited

U.S. PATENT DOCUMENTS

2011/0222615 A1    9/2011   Kuo et al.
2013/0235807 A1*   9/2013   Lee et al. ............... 370/329
2014/0064133 A1*   3/2014   Kazmi et al. ............ 370/252

FOREIGN PATENT DOCUMENTS

WO    WO 95/01690 A1      1/1995
WO    WO 2006/053340 A2   5/2006

OTHER PUBLICATIONS

"Timing Advance for Uplink CoMP", Samsung, 3GPP TSG-RAN WG1#66bis meeting, Oct. 10-14, 2011, 6 pages.

* cited by examiner

US 9,344,169 B2

SIGNAL TRANSMISSION METHOD, SYSTEM, AND DEVICE

CROSS-REFERENCE TO RELATED APPLICATIONS

This application is a continuation of International Application No. PCT/CN2013/076154, filed on May 23, 2013, which claims priority to Chinese Patent Application No. 201210401050.1, filed on Oct. 19, 2012, both of which are hereby incorporated by reference in their entireties.

TECHNICAL FIELD

The present invention relates to the field of communications technologies, and in particular, to a signal transmission method, system, and device.

BACKGROUND

In a wireless cellular communications system, there are two directions of data transmission: downlink and uplink. The downlink refers to data transmission from a base station to a user terminal; and the uplink refers to data transmission from a user terminal to a base station.

In addition, in a scenario of a cell handover in the wireless cellular communications system, a user terminal may perform data transmission with multiple base stations, that is, the user terminal may be associated with at least two base stations, and transmits data to them.

In the prior art, the user terminal only can transmit data to one base station within one time segment and transmit data to another base station within another time segment, that is, cannot transmit data to two base stations within one time segment simultaneously, thereby causing that transmission efficiency of data transmission of the user terminal is relatively low.

SUMMARY

The present invention provides a transmission method, system, and device used for a signal, so as to solve a problem that, in the prior art, a user terminal cannot transmit data to two base stations simultaneously, thereby causing that transmission efficiency of data transmission of the user terminal is relatively low.

In a first aspect, the present invention provides a signal transmission method, including:

setting K virtual users, where each of the virtual users is associated with one base station;

obtaining base station precode and user precode corresponding to each of the K virtual users;

splitting a baseband signal to the K virtual users, and obtaining a split baseband signal corresponding to each of the K virtual users;

processing, according to the base station precode and the user precode corresponding to each of the virtual users, the split baseband signal corresponding to each of the virtual users, and obtaining an uplink signal corresponding to each virtual user; and obtaining timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmitting, through an antenna, the uplink signal corresponding to each of the virtual users to the base station corresponding to each of the virtual users;

where K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K.

In another aspect, the present invention provides a signal transmission device, including:

a setting module, configured to set K virtual users, where each of the virtual users is associated with one base station;

an obtaining module, configured to obtain base station precode and user precode corresponding to each of the K virtual users;

a splitting module, configured to split a baseband signal to the K virtual users, and obtain a split baseband signal corresponding to each of the K virtual users;

a processing module, configured to process, according to the base station precode and the user precode corresponding to each of the virtual users, the split baseband signal corresponding to each of the virtual users, and obtain an uplink signal corresponding to each virtual user; and a sending module, configured to obtain timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmit, through an antenna, the uplink signal corresponding to the virtual user to the base station corresponding to each virtual user;

where K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K.

In still another aspect, the present invention provides a signal transmission system, including a base station and a user terminal, where the user terminal is a signal transmission device according to any one of claims 10 to 18; and the base station is associated with one virtual user of the user terminal.

Technical effects of the present invention are: by setting K virtual users, where each virtual user is associated with one base station, obtaining base station precode and user precode corresponding to each of the K virtual users, and splitting a baseband signal to the K virtual users, and obtaining a split baseband signal corresponding to each of the K virtual users, and processing, according to the base station precode and the user precode corresponding to each virtual user, the split baseband signal corresponding to each user, and obtain an uplink signal corresponding to each virtual user; and then, by obtaining timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmitting, through an antenna, the uplink signal corresponding to each virtual user to the base station corresponding to each virtual user, a user terminal transmits the same or different uplink signals to the same or different base stations simultaneously, it is ensured that interference between uplink signals of different virtual users is controllable, and furthermore, efficiency that the user terminal transmits an uplink signal is effectively improved.

DETAILED DESCRIPTION

Embodiments of the present invention are mainly based on the following two scenarios:

First: The number of antennas of a base station is generally less than the number of antennas of a user terminal.

Second: When the number of antennas of a base station is greater than or equal to the number of antennas of a user terminal, due to correlation of the antennas, the maximum number of data streams transmitted by the base station to the user terminal is less than the number of the antennas of the user terminal.

In an actual wireless cellular system, there are mainly two types of scenarios that meet description of the second scenario.

First type: A multi-antenna user terminal is located in a service range of a macro base station (Macro BS). Due to a size of an antenna of the macro base station, although the macro base station possibly has more antennas than the user terminal has, strong correlation between the antennas makes the maximum number of data streams transmitted by the macro base station to the user terminal be less than the number of antennas of the user terminal.

Second type: A multi-antenna user terminal is located in a service range of a micro base station (Pico BS or Femto BS). Because the micro base station is set up at a low height and generally located at an urban district, and a communications signal has strong directivity, so that the user terminal may transmit uplink transmission signals in different directions through multiple antennas, so as to communicate with micro cells in different directions; and mutual interference is relatively small. Therefore, the number of antennas of the user terminal is large enough, and signal directions of different base stations can be distinguished.

Figure 1:
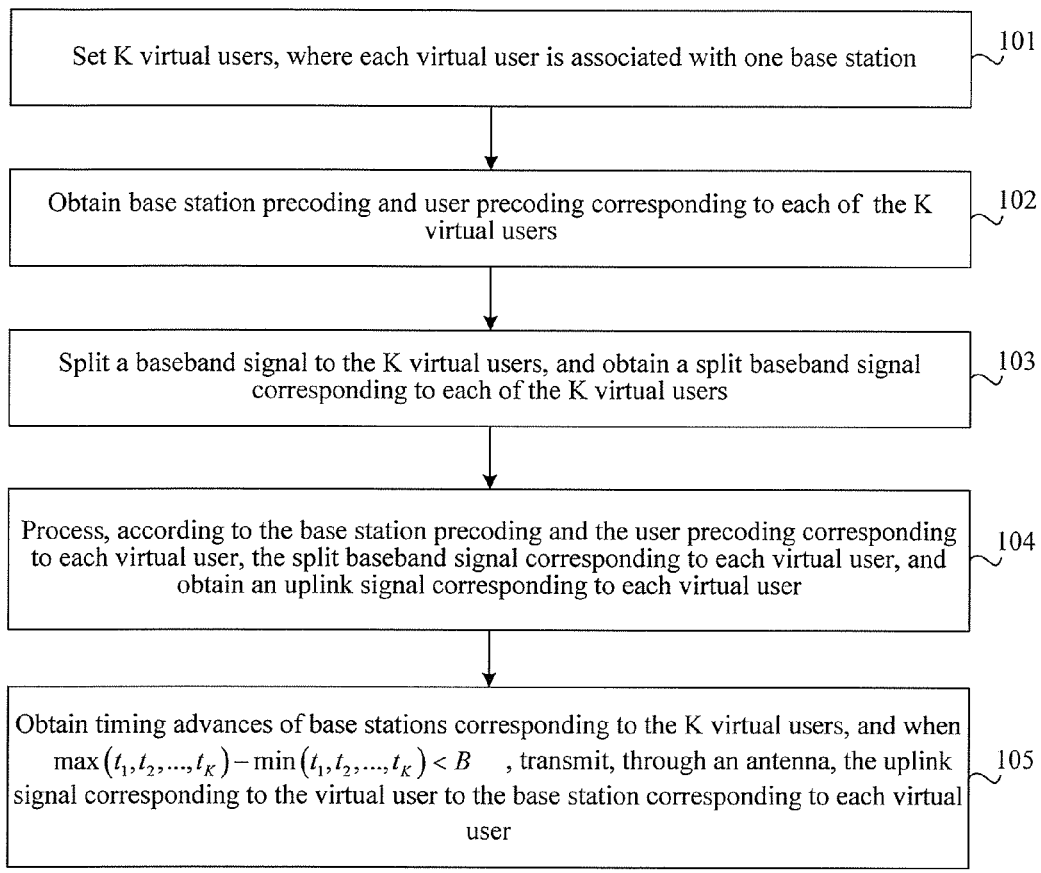
FIG. 1 is a flow chart of a signal transmission method according to an embodiment of the present invention.

FIG. 1 is a flow chart of a signal transmission method according to an embodiment of the present invention. As shown in FIG. 1, the method in the present invention includes:

Step 101: Set K virtual users, where each virtual user is associated with one base station.

In this embodiment, a user terminal may set multiple virtual users (recorded as K), where one identity (Identity, ID for short) is set for each virtual user, which is associated with one corresponding base station. It also needs to be noted that, the multiple virtual users may be associated with different base stations or the same base station, that is, a base station i and a base station j may represent the same base station, where i and j are integers, i is not equal to j, and both i and j are greater than or equal to 1 and are less than or equal to K.

Step 102: Obtain base station precode and user precode corresponding to each of the K virtual users.

In this embodiment, initially, i is equal to 1. After base station precode $P_1$ and user precode $Q_1$ corresponding to a virtual user 1 are obtained, i is added by 1 to perform calculation to obtain base station precode $P_2$ and user precode $Q_2$ corresponding to a virtual user 2, and this step is repeatedly performed until calculation is performed to obtain base station precode $P_K$ and user precode $Q_K$ corresponding to a virtual user K.

Step 103: Split a baseband signal to the K virtual users, and obtain a split baseband signal corresponding to each of the K virtual users.

In this embodiment, the baseband signal is split, so that each virtual user obtains a part of the baseband signal. In addition, the baseband signal obtained by each virtual user may be the same or may be different.

Step 104: Process, according to the base station precode and the user precode corresponding to each virtual user, the split baseband signal corresponding to each virtual user, and obtain an uplink signal corresponding to each virtual user.

Step 105: Obtain timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmit, through an antenna, the uplink signal corresponding to the virtual user to the base station corresponding to each virtual user.

Both i and K are integers, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K.

In this embodiment, if moments at which all of user terminals reach base stations are not aligned with predetermined moments of the base stations, mutual interference may occur. Therefore, each user terminal obtains a timing advance of its corresponding base station, so that moments at which uplink signals of all the user terminals reach air interfaces of the base stations are aligned. The timing advance is related to a distance from the user terminal. A greater timing advance indicates a greater distance between a user terminal and a base station.

In addition, preferably, when $\max(t_1, t_2, \ldots, t_K) - \min(t_1, t_2, \ldots, t_K) < B$, the uplink signal corresponding to the virtual user may be transmitted, through the antenna, to the base station corresponding to each virtual user simultaneously.

In this embodiment, because different base station uplinks possibly use different timing advances (Timing Advance), if a user transmits an uplink baseband signal to K base stations simultaneously and a difference between timing advances required by these base stations is greater than a preset threshold, some base stations possibly fail to receive the baseband signal normally. Therefore, the timing advances of the K base stations need to be compared and only when $\max(t_1, t_2, \ldots, t_K) - \min(t_1, t_2, \ldots, t_K) < B$, it can be ensured that each base station can receive the baseband signal normally.

In addition, when $\max(t_1, t_2, \ldots, t_K) - \min(t_1, t_2, \ldots, t_K) \geq B$, it indicates that some base stations possibly fail to receive the baseband signal normally. Therefore, M virtual users may be selected from the K virtual users, where timing advances of base stations corresponding to the M virtual users satisfy $\max(t_1, t_2, \ldots, t_M) - \min(t_1, t_2, \ldots, t_M) < B$. Therefore, uplink signals corresponding to the virtual users may be transmitted, through antennas, to the base stations corresponding to the M virtual users simultaneously.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when $\max(t_1, t_2, \ldots, t_K) - \min(t_1, t_2, \ldots, t_K) < B$, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Figure 2:
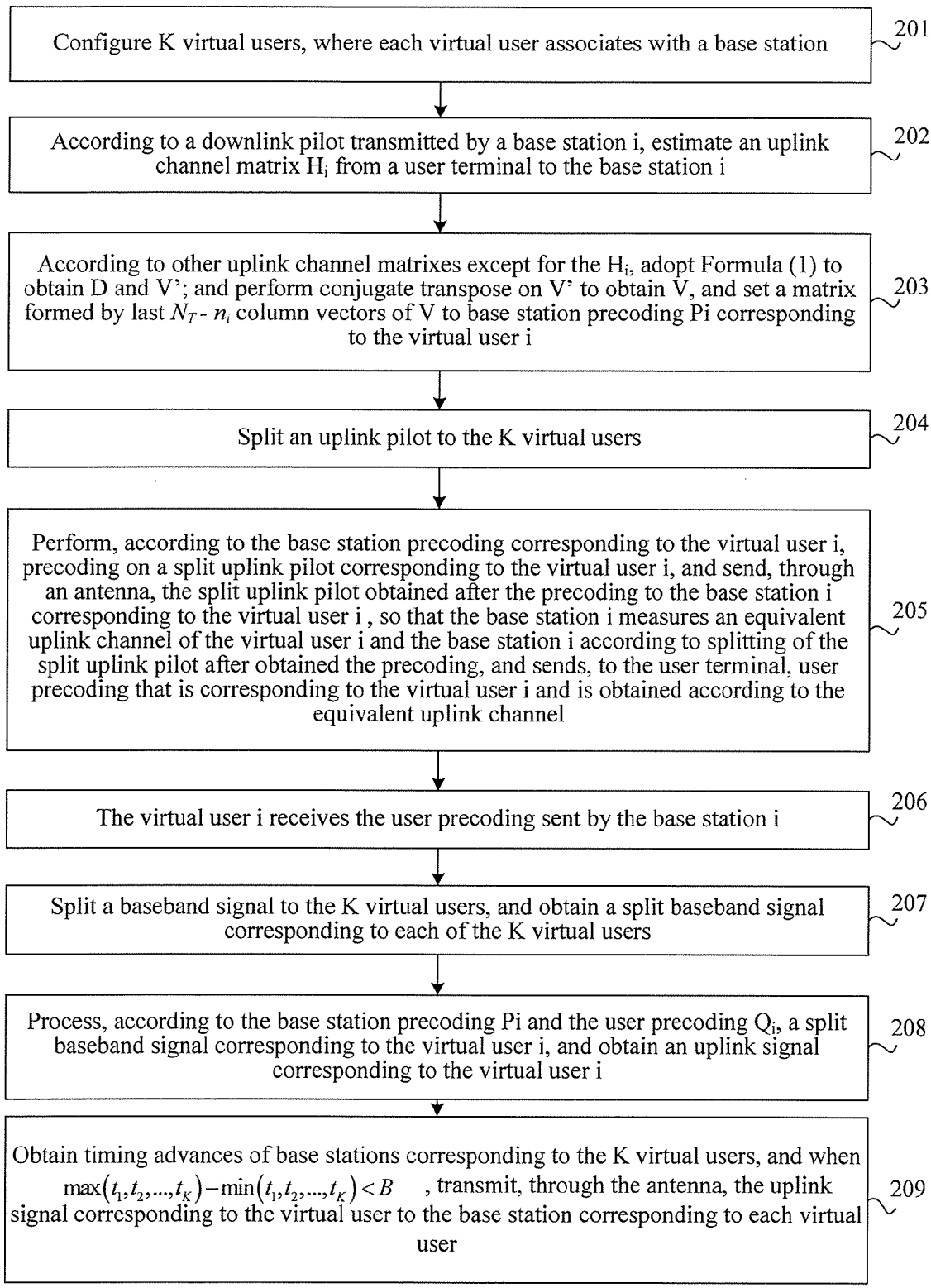
FIG. 2 is a flow chart of a signal transmission method according to another embodiment of the present invention.

FIG. 2 is a flow chart of a signal transmission method according to another embodiment of the present invention. In this embodiment, a technical solution of the present invention is described in detail by using that a base station adopts a duplex mode of TDD and a user terminal also adopts a duplex mode of TDD as an example. As shown in FIG. 2, the method includes:

Step 201: Set K virtual users, where each virtual user is associated with one base station.

In this embodiment, a user terminal may set multiple virtual users (recorded as K), where one ID is set for each virtual user, which is associated with one corresponding base station. It also needs to be noted that, the multiple virtual users may be associated with different base stations or the same base station, that is, a base station i and a base station j may represent the same base station, where i and j are integers, and i is not equal to j.

Step 202: Estimate an uplink channel matrix $H_i$ from the user terminal to the base station i according to a downlink pilot transmitted by the base station i.

In this embodiment, preferably, because in the duplex mode of the TDD, the uplink and the downlink use the same frequency spectrum, a downlink channel is an uplink channel, that is, the user terminal may estimate an uplink channel matrix from the user terminal to each base station through a downlink pilot transmitted to each base station, so as to obtain uplink channel matrices $\{H_1, H_2, \ldots, H_K\}$ from the user terminal to K base stations.

Step 203: According to other uplink channel matrices except for $H_i$, adopt Formula (1):

$$\begin{bmatrix} H_1 \\ \vdots \\ H_{i-1} \\ H_{i+1} \\ \vdots \\ H_K \end{bmatrix} = UDV' \quad (1)$$

to obtain D and V'; perform conjugate transpose on V' to obtain V, and set a matrix formed by last $N_T - n_i$ column vectors of V to base station precode $P_i$ corresponding to a virtual user i; and repeatedly perform this step until base station precode $P_K$ corresponding to a virtual user K is obtained.

$n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix},$$

and the elements on the diagonal line of D are sorted in descending order; and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

In addition, in this embodiment, the number of effective antennas of the base station i is $N_i$, and $H_i$ is a complex matrix of dimensions $N_i \times N_T$.

It also needs to be noted that, a prerequisite for executing Formula (1) is that each virtual user is associated with a different base station. When a base station associated with a certain virtual user is the same as a base station associated with the virtual user i, an uplink channel matrix from the user terminal to the base station associated with the certain virtual user also needs to be excluded when step 203 is performed. For example, when the base station i associated with the virtual user i and the base station j associated with a virtual user j are the same base station, Formula (1) is replaced with Formula (2):

$$\begin{bmatrix} H_1 \\ \vdots \\ H_{i-1} \\ H_{i+1} \\ \vdots \\ H_{j-1} \\ H_{j+1} \\ \vdots \\ H_K \end{bmatrix} = UDV' \qquad (2)$$

Step 204: Split an uplink pilot to the K virtual users.

Step 205: Perform, according to the base station precode $P_i$ corresponding to the virtual user i, precoding on a split uplink pilot corresponding to the virtual user i, and send, through an antenna, the split uplink pilot obtained after the precoding to the base station i corresponding to the virtual user i, so that the base station i measures an equivalent uplink channel $H_iP_i$ of the virtual user i and the base station i according to splitting of the split uplink pilot obtained after the precoding, and sends, to the user terminal, user precode $Q_i$ that is corresponding to the virtual user i and is obtained according to the equivalent uplink channel $H_iP_i$.

Step 206: The virtual user i receives the user precode $Q_i$ sent by the base station i. Step 205 and step 206 are repeatedly performed until the virtual user K receives user precode $Q_K$ sent by the base station In this embodiment, for the base station, the number of antennas of the virtual user i is $N_T - n_i$. In addition, the base station i performs scheduling based on splitting of an uplink pilot that is obtained after the precoding and is sent by a virtual user in all user terminals within a certain cell of the base station i, so as to obtain the user precode $Q_i$ corresponding to the virtual user i, and send, through the equivalent uplink channel $H_iP_i$, the user precode $Q_i$ corresponding to the virtual user i to a user terminal to which the virtual user i belongs.

In this embodiment, the following several implementation manners may be mainly adopted for the base station i to obtain the user precode $Q_i$ corresponding to the virtual user i:

First: The base station i determines the user precode $Q_i$ corresponding to the virtual user i by using an existing single-cell uplink pre-coder algorithm and based on uplink pilots of all user terminals in a certain cell of the base station i.

Second: The base station i sets the user precode $Q_i$ corresponding to the virtual user i by using an identity matrix user precode.

Step 207: Split a baseband signal to the K virtual users, and obtain a split baseband signal corresponding to each of the K virtual users.

Step 208: Process, according to the base station precode $P_i$ and the user precode $Q_i$, a split baseband signal corresponding to the virtual user i, and obtain an uplink signal corresponding to the virtual user i. This step is repeatedly performed until an uplink signal corresponding to the virtual user K is obtained.

Step 209: Obtain timing advances $\{t_1, t_2, \ldots, t_K\}$ of base stations corresponding to the K virtual users, and when max$(t_1, t_2, \ldots, t_K) -$ min$(t_1, t_2, \ldots, t_K) < B$, simultaneously transmit, through the antenna, the uplink signal corresponding to the virtual user to the base station corresponding to each virtual user.

Both i and K are integers, and both i and K are greater than or equal to 1; i is less than or equal to K, and a value range of i is [1, K]; B is a preset threshold; $t_1$ is a timing advance of a base station 1 corresponding to a virtual user 1; $t_2$ is a timing advance of a base station 2 corresponding to a virtual user 2; and $t_K$ is a timing advance of the base station K corresponding to the virtual user K.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when max$(t_1, t_2, \ldots, t_K) -$ min$(t_1, t_2, \ldots, t_K) < B$, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Figure 3A:
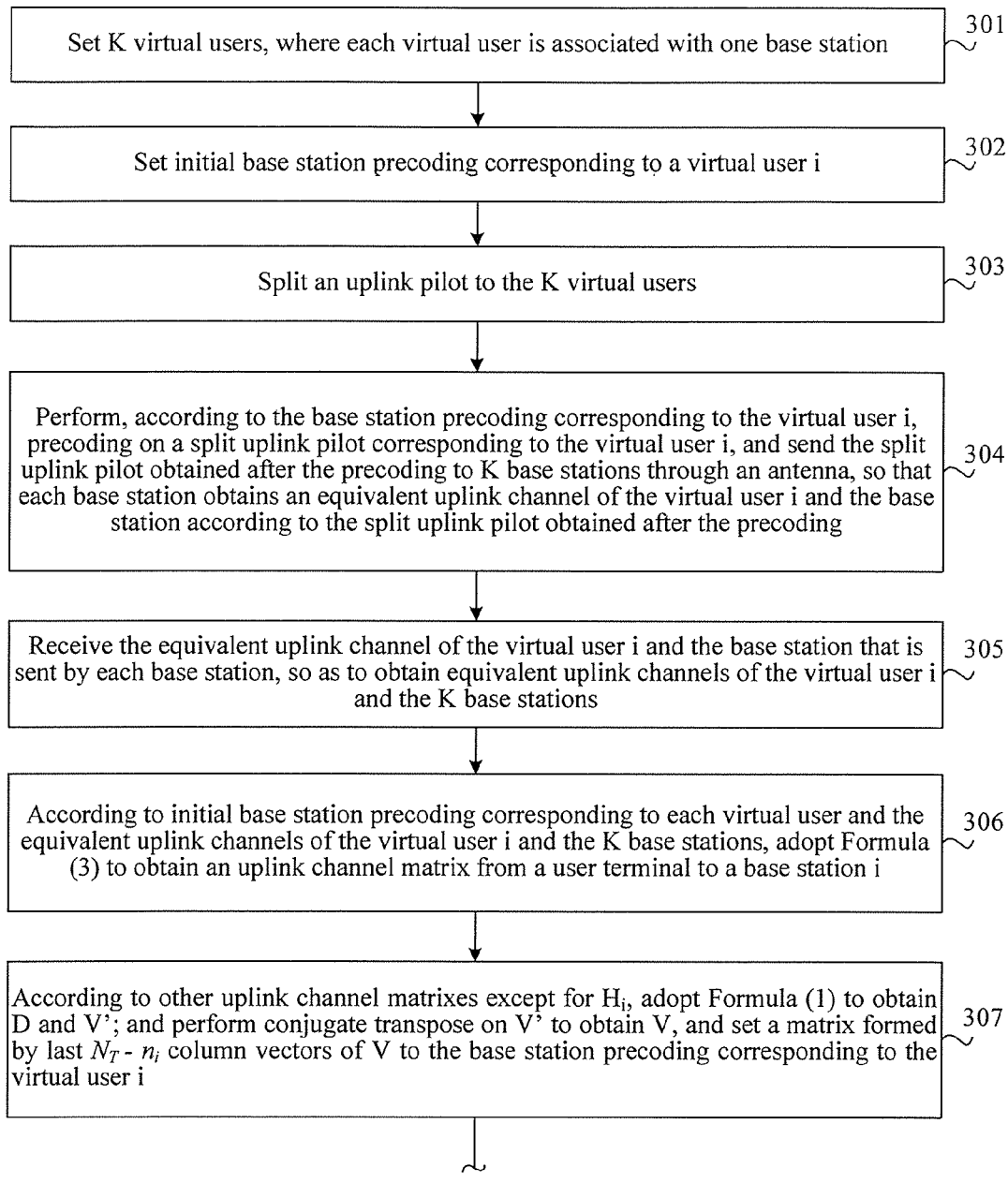
FIG. 3A and FIG. 3B are a flow chart of a signal transmission method according to still another embodiment of the present invention.
Figure 3B:
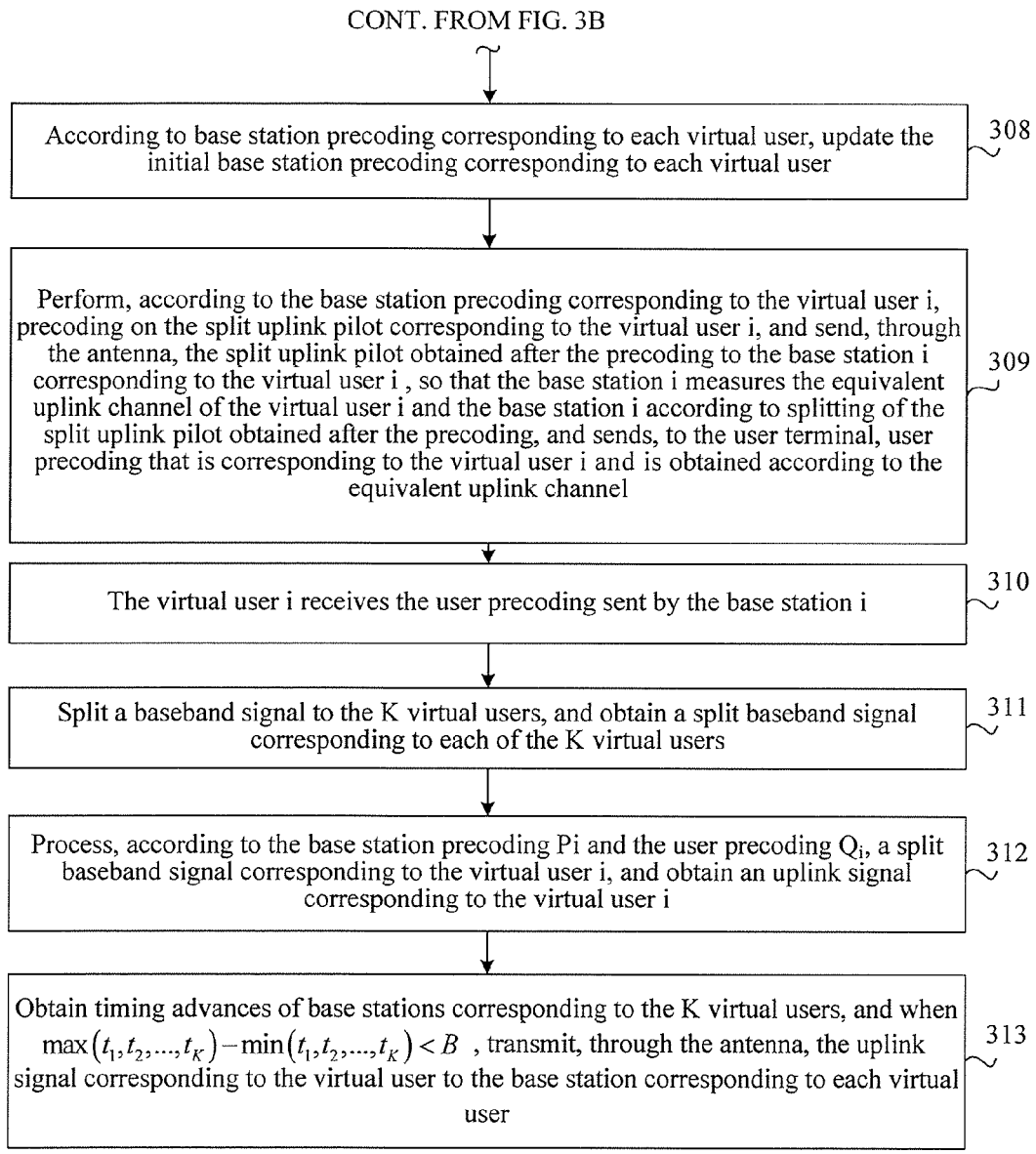

FIG. 3 is a flow chart of a signal transmission method according to still another embodiment of the present invention. In this embodiment, a technical solution of the present invention is described in detail by using that a user terminal is located in a service range of an FDD macro base station as an example.

It needs to be noted that, in this embodiment, because a macro base station is set up at a high position and there are many reflectors surrounding a user terminal, for the user terminal, a downlink signal of the base station does not has obvious directivity, that is, angular spread (angular spread) of the downlink signal is relatively large.

Specifically, as shown in FIG. 3, the method includes:

Step 301: Set K virtual users, where each virtual user is associated with one base station.

In this embodiment, a user terminal may set multiple virtual users (recorded as K), where one ID is set for each virtual user, which is associated with one corresponding base station. It also needs to be noted that, the multiple virtual users may be associated with different base stations or the same base station, that is, a base station i and a base station j may represent the same base station, where i and j are integers, and i is not equal to j.

Step 302: Set initial base station precode $P_i'$ corresponding to a virtual user i. This step is repeatedly performed until initial base station precode $P_K'$ corresponding to a virtual user K is set.

Step 303: Split an uplink pilot to the K virtual users.

Step 304: Perform, according to the base station precode $P_i'$ corresponding to the virtual user i, precoding on a split uplink pilot corresponding to the virtual user i, and send the split uplink pilot obtained after the precoding to K base stations through an antenna, so that each base station obtains an equivalent uplink channel of the virtual user i and the base station according to the split uplink pilot obtained after the precoding.

Step 305: Receive the equivalent uplink channel of the virtual user i and the base station that is sent by each base station, so as to obtain equivalent uplink channels $\{H_1P_i', H_2P_i', \ldots, H_KP_i'\}$ of the virtual user i and the K base stations.

Step 306: According to initial base station precode corresponding to each virtual user and the equivalent uplink channels $\{H_1P_i', H_2P_i', \ldots, H_KP_i'\}$ of the virtual user i and the K base stations, adopt Formula (3):

$$H_i = [H_iP_1', H_iP_2', \ldots, H_iP_K'][P_1', P_2', \ldots, P_K']^{-1} \quad (3)$$

to obtain an uplink channel matrix $H_i$ from the user terminal to the base station i.

Step 307: According to other uplink channel matrices except for $H_i$, adopt Formula (1):

$$\begin{bmatrix} H_1 \\ \vdots \\ H_{i-1} \\ H_{i+1} \\ \vdots \\ H_K \end{bmatrix} = UDV' \quad (1)$$

to obtain D and V'; and perform conjugate transpose on V' to obtain V, and set a matrix formed by last $N_T - n_i$ column vectors of V to the base station precode $P_i$ corresponding to the virtual user i.

$n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix},$$

and the elements on the diagonal line of D are sorted in descending order; and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

In this embodiment, the number of effective antennas of the base station i is $N_i$, and $H_i$ is a complex matrix of dimensions $N_i \times N_T$. A prerequisite for executing Formula (1) is that each virtual user is associated with a different base station. When a base station associated with a certain virtual user is the same as a base station associated with the virtual user i, an uplink channel matrix from the user terminal to the base station associated with the certain virtual user also needs to be excluded when step 307 is performed. For example, when the base station i associated with the virtual user i and the base station j associated with a virtual user j are the same base station, Formula (1) is replaced with Formula (2):

$$\begin{bmatrix} H_1 \\ \vdots \\ H_{i-1} \\ H_{i+1} \\ \vdots \\ H_{j-1} \\ H_{j+1} \\ \vdots \\ H_K \end{bmatrix} = UDV' \quad (2)$$

In addition, in this embodiment, step 304 to step 307 are repeatedly performed until base station precode $P_K$ corresponding to the virtual user K is obtained.

Step 308: According to base station precode corresponding to each virtual user, update the initial base station precode corresponding to each virtual user.

In this embodiment, step 304 to step 308 may be periodically performed, so as to enable the user terminal to update the initial base station precode corresponding to each virtual user in real time.

Step 309: Perform, according to the base station precode $P_i$ corresponding to the virtual user i, precoding on the split uplink pilot corresponding to the virtual user i, and send, through the antenna, the split uplink pilot obtained after the precoding to the base station i corresponding to the virtual user i, so that the base station i measures the equivalent uplink channel $H_iP_i$ from the virtual user i to the base station i according to the split uplink pilot obtained after the precoding, and sends, to the user terminal, user precode $Q_i$ that is corresponding to the virtual user i and is obtained according to the equivalent uplink channel $H_iP_i$.

Step 310: The virtual user i receives the user precode $Q_i$ sent by the base station i.

In this embodiment, step 309 to step 310 are repeatedly performed until the virtual user K receives user precode $Q_K$ sent by a base station K.

In addition, in this embodiment, for the base station, the number of antennas of the virtual user i is $N_T - n_i$. In addition, the base station i performs scheduling based on splitting of an uplink pilot that is obtained after the precoding and is sent by a virtual user in all user terminals within a certain cell of the base station i, so as to obtain the user precode $Q_i$ corresponding to the virtual user i, and send the user precode $Q_i$ corresponding to the virtual user i to a user terminal to which the virtual user i belongs.

In this embodiment, the following several implementation manners may be mainly adopted for the base station i to obtain the user precode $Q_i$ corresponding to the virtual user is i:

First: The base station i determines the user precode $Q_i$ corresponding to the virtual user i by using an existing single-cell uplink pre-coder algorithm and based on uplink pilots of all user terminals in a certain cell of the base station i.

Second: The base station i sets the user precode $Q_i$ corresponding to the virtual user i by using an identity matrix.

Step 311: Split a baseband signal to the K virtual users, and obtain a split baseband signal corresponding to each of the K virtual users.

Step 312: Process, according to the base station precode $P_i$ and the user precode $Q_i$, a split baseband signal corresponding to the virtual user i, and obtain an uplink signal corresponding to the virtual user i. This step is repeatedly performed until an uplink signal corresponding to the virtual user K is obtained.

Step 313: Obtain timing advances $\{t_1, t_2, \ldots, t_K\}$ of base stations corresponding to the K virtual users, and when max $(t_1, t_2, \ldots, t_K)$−min$(t_1, t_2, \ldots, t_K)$<B, transmit, through the antenna, the uplink signal corresponding to the virtual user to the base station corresponding to each virtual user.

Both i and K are integers, and both i and K are greater than or equal to 1; i is less than or equal to K, and a value range of i is [1, K]; B is a preset threshold; $t_1$ is a timing advance of a base station 1 corresponding to a virtual user 1; $t_1$ is a timing advance of a base station 2 corresponding to a virtual user 2; and $t_K$ is a timing advance of the base station K corresponding to the virtual user K.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when max$(t_1, t_2, \ldots, t_K)$−min$(t_1, t_2, \ldots, t_K)$<B, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Figure 4:
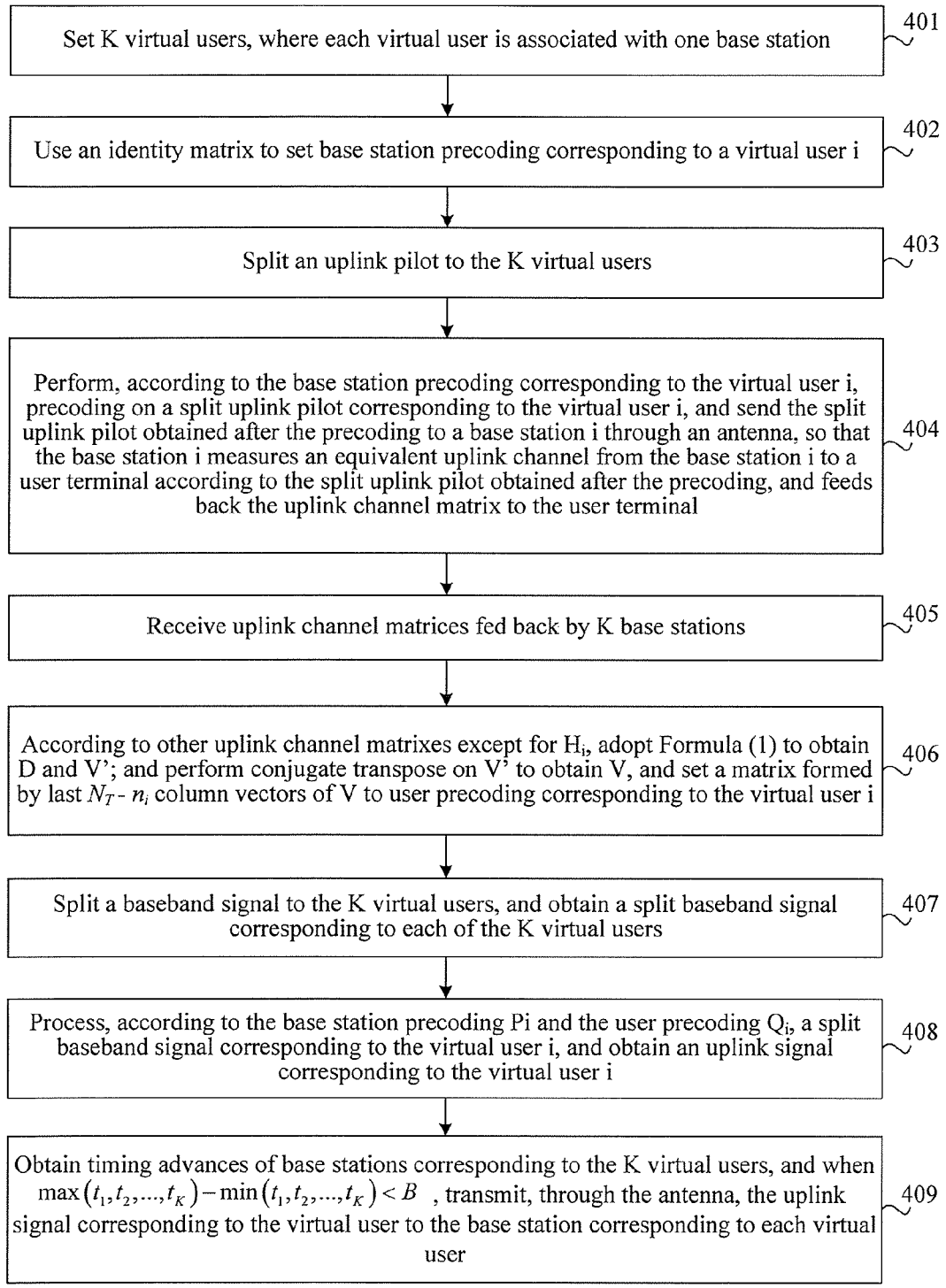
FIG. 4 is a flow chart of a signal transmission method according to yet another embodiment of the present invention.

FIG. 4 is a flow chart of a signal transmission method according to yet another embodiment of the present invention. In this embodiment, a technical solution of the present invention is described in detail by using that a user terminal is located in a service range of an FDD macro base station as an example.

It needs to be noted that, in this embodiment, because a macro base station is set up at a high position and there are many reflectors surrounding a user terminal, for the user terminal, a downlink signal of the base station does not has obvious directivity, that is, angular spread (angular spread) of the downlink signal is relatively large.

Specifically, as shown in FIG. 4, the method includes:

Step 401: Set K virtual users, where each virtual user is associated with one base station.

In this embodiment, a user terminal may set multiple virtual users (recorded as K), where one identity ID is configured for each virtual user, which is associated with one corresponding base station. It also needs to be noted that, the multiple virtual users may be associated with different base stations or the same base station, that is, a base station i and a base station j may represent the same base station, where i and j are integers, and i is not equal to j.

Step 402: Use an identity matrix to set base station precode $P_i$ corresponding to a virtual user i. This step is repeatedly performed until base station precode $P_K$ corresponding to a virtual user K is set.

Step 403: Split an uplink pilot to the K virtual users.

Step 404: Perform, according to the base station precode $P_i'$ corresponding to the virtual user i, precoding on a split uplink pilot corresponding to the virtual user i, and send the split uplink pilot obtained after the precoding to the base station i through the antenna, so that the base station i measures an equivalent uplink matrix from the base station i to the user terminal according to the split uplink pilot obtained after the precoding, and feeds back the uplink channel matrix to the user terminal.

Step 405: Receive uplink channel matrices $\{H_1, H_2, \ldots, H_K\}$ fed back by K base stations.

Step 406: According to other uplink channel matrices except for $H_i$, adopt Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T-n_i$ column vectors of V to user precode $Q_i$ corresponding to the virtual user i.

$n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

In this embodiment, the number of effective antennas of the base station i is $N_i$, and $H_i$ is a complex matrix of dimensions $N_i \times N_T$. A prerequisite for executing Formula (1) is that each virtual user is associated with a different base station. When a base station associated with a certain virtual user is the same as a base station associated with the virtual user i, an uplink channel matrix from the user terminal to the base station associated with the certain virtual user also needs to be excluded when step 406 is performed. For example, when the base station i associated with the virtual user i and the base station j associated with a virtual user j are the same base station, Formula (1) is replaced with Formula (2):

$$\begin{bmatrix} H_1 \\ \vdots \\ H_{i-1} \\ H_{i+1} \\ \vdots \\ H_{j-1} \\ H_{j+1} \\ \vdots \\ H_K \end{bmatrix} = UDV' \qquad (2)$$

In this embodiment, step 404 to step 406 are repeatedly performed until user precode $Q_K$ corresponding to the virtual user K is obtained.

Step 407: Split a baseband signal to the K virtual users, and obtain a split baseband signal corresponding to each of the K virtual users.

Step 408: Process, according to the base station precode $P_i$ and the user precode $Q_i$, a split baseband signal corresponding to the virtual user i, and obtain an uplink signal corresponding to the virtual user i. This step is repeatedly performed until an uplink signal corresponding to the virtual user K is obtained.

Step 409: Obtain timing advances $\{t_1, t_2, \ldots, t_K\}$ of base stations corresponding to the K virtual users, and when max $(t_1, t_2, \ldots, t_K)$−min$(t_1, t_2, \ldots, t_K)$<B, simultaneously transmit, through the antenna, the uplink signal corresponding to the virtual user to the base station corresponding to each virtual user.

Both i and K are integers, and both i and K are greater than or equal to 1; i is less than or equal to K, and a value range of i is [1, K]; B is a preset threshold; $t_1$ is a timing advance of a base station 1 corresponding to the virtual user 1; $t_2$ is a timing advance of a base station 2 corresponding to a virtual user 2; and $t_K$ is a timing advance of a base station K corresponding to the virtual user K.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when max$(t_1, t_2, \ldots, t_K)$−min$(t_1, t_2, \ldots, t_K)$<B, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Figure 5:
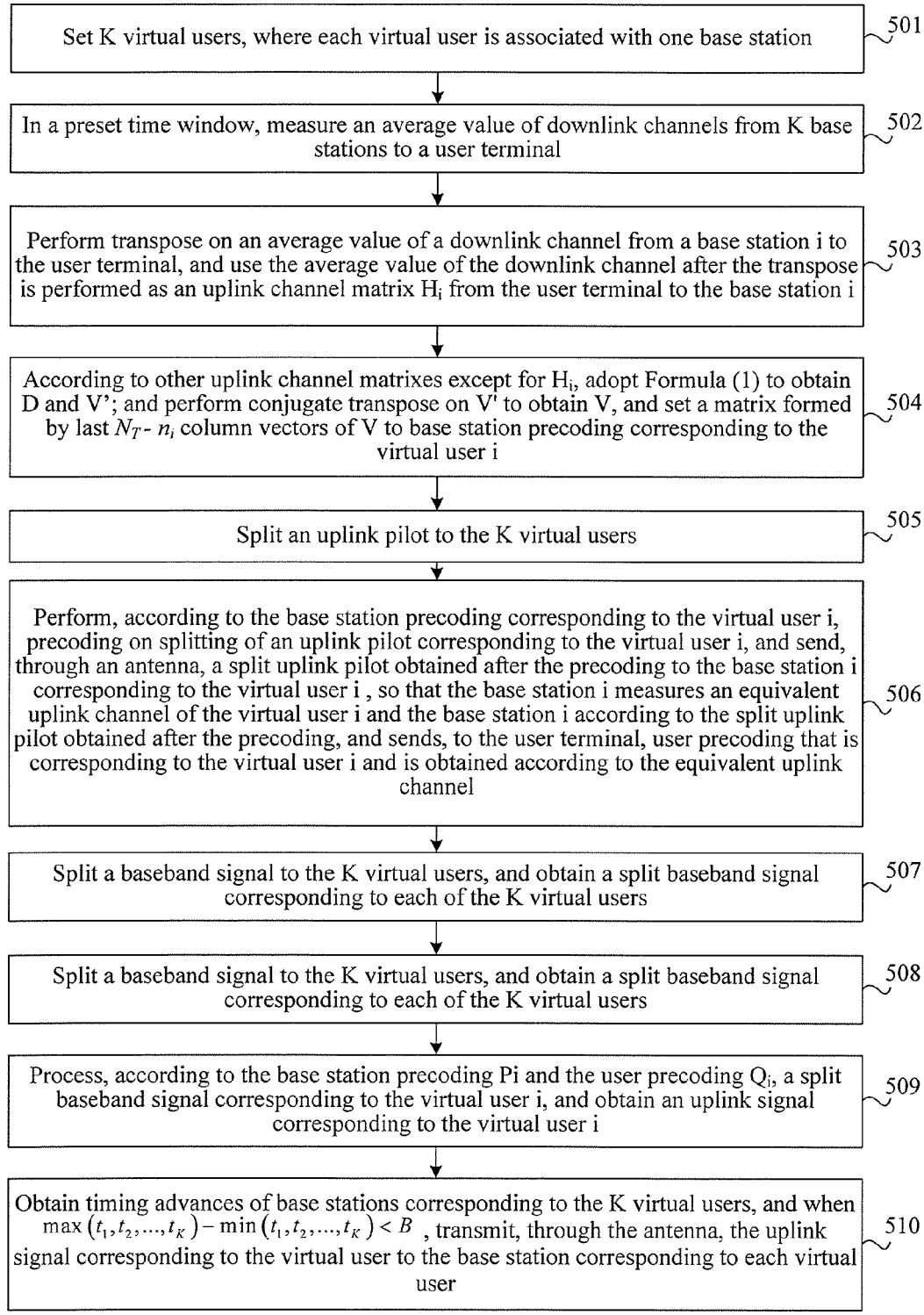
FIG. 5 is a flow chart of a signal transmission method according to yet another embodiment of the present invention.

FIG. 5 is a flow chart of a signal transmission method according to yet another embodiment of the present invention. In this embodiment, a technical solution of the present invention is described in detail by using that a user terminal is located in a service range of an FDD micro base station as an example.

It needs to be noted that, in this embodiment, because a micro base station is set up at a low position, and most signals have directivity, a user terminal does not need to measure an uplink channel, but may directly use an average downlink channel matrix as an estimated value of an uplink channel matrix.

Specifically, as shown in FIG. 5, the method includes:

Step 501: Set K virtual users, where each virtual user is associated with one base station.

In this embodiment, a user terminal may set multiple virtual users (recorded as K), where one identity ID is configured for each virtual user, which is associated with one corresponding base station. It also needs to be noted that, the multiple virtual users may be associated with different base stations or the same base station, that is, a base station i and a base station j may represent the same base station, where i and j are integers, and i is not equal to j.

Step 502: In a preset time window, measure an average value $\{F_1, F_2, \ldots F_K\}$ of downlink channels from K base stations to the user terminal.

Step 503: Perform transpose on an average value $F_i$ of a downlink channel from the base station i to the user terminal, and use the average value of the downlink channel after the transpose is performed as an uplink channel matrix $H_i$ from the user terminal to the base station i.

Step 504: According to other uplink channel matrices except for $H_i$, adopt Formula (1):

$$\begin{bmatrix} H_1 \\ \vdots \\ H_{i-1} \\ H_{i+1} \\ \vdots \\ H_K \end{bmatrix} = UDV' \qquad (1)$$

to obtain D and V'; and perform conjugate transpose on V' to obtain V, and set a matrix formed by last $N_T$−$n_i$ column vectors of V to base station precode $P_i$ corresponding to a virtual user i.

$n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix},$$

and the elements on the diagonal line of D are sorted in descending order; and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

In addition, in this embodiment, the number of effective antennas of the base station i is $N_i$, and $H_i$ is a complex matrix of dimensions $N_i \times N_T$.

In this embodiment, step 503 and step 504 are repeatedly performed until user precode $P_K$ corresponding to a virtual user K is obtained.

It also needs to be noted that, a prerequisite for executing Formula (1) is that each virtual user is associated with a different base station. When a base station associated with a certain virtual user is the same as a base station associated with the virtual user i, an uplink channel matrix from the user terminal to the base station associated with the certain virtual user also needs to be excluded when step 504 is performed. For example, when the base station i associated with the virtual user i and the base station j associated with a virtual user j are the same base station, Formula (1) is replaced with Formula (2):

$$\begin{bmatrix} H_1 \\ \vdots \\ H_{i-1} \\ H_{i+1} \\ \vdots \\ H_{j-1} \\ H_{j+1} \\ \vdots \\ H_K \end{bmatrix} = UDV' \quad (2)$$

Step 505: Split an uplink pilot to the K virtual users.

Step 506: Perform, according to the base station precode $P_i$ corresponding to the virtual user i, precoding on a split uplink pilot corresponding to the virtual user i, and send, through an antenna, the split uplink pilot obtained after the precoding to the base station i corresponding to the virtual user i, so that the base station i measures an equivalent uplink channel $H_i P_i$ of the virtual user i and the base station i according to the split uplink pilot obtained after the precoding, and sends, to the user terminal, user precode $Q_i$ that is corresponding to the virtual user i and is obtained according to the equivalent uplink channel $H_i P_i$.

Step 507: The virtual user i receives the user precode $Q_i$ sent by the base station i.

In this embodiment, step 506 and step 507 are repeatedly performed until the virtual user K receives user precode $Q_K$ sent by a base station K.

In this embodiment, for the base station, the number of antennas of the virtual user i is $N_T - n_i$. In addition, the base station i performs scheduling based on splitting of an uplink pilot that is obtained after the precoding and is sent by a virtual user in all user terminals within a certain cell of the base station i, so as to obtain the user precode $Q_i$ corresponding to the virtual user i, and send the user precode $Q_i$ corresponding to the virtual user i to a user terminal to which the virtual user i belongs.

In this embodiment, the following several implementation manners may be mainly adopted for the base station i to obtain the user precode $Q_i$ corresponding to the virtual user i:

First: The base station i determines the user precode $Q_i$ corresponding to the virtual user i based on the split uplink pilot that is obtained after the precoding and is reported by a virtual user in all user terminals in a certain cell of the base station i.

Second: The base station i sets the user precode $Q_i$ corresponding to the virtual user i by using an identity matrix.

Step 508: Split a baseband signal to the K virtual users, and obtain a split baseband signal corresponding to each of the K virtual users.

Step 509: Process, according to the base station precode $P_i$ and the user precode $Q_i$, a split baseband signal corresponding to the virtual user i, and obtain an uplink signal corresponding to the virtual user i. This step is repeatedly performed until an uplink signal corresponding to the virtual user K is obtained.

Step 510: Obtain timing advances $\{t_1, t_2, \ldots, t_K\}$ of base stations corresponding to the K virtual users, and when max $(t_1, t_2, \ldots, t_K) - \min(t_1, t_2, \ldots, t_K) < B$, transmit, through the antenna, the uplink signal corresponding to the virtual user to the base station corresponding to each virtual user.

Both i and K are integers, and both i and K are greater than or equal to 1; i is less than or equal to K, and a value range of i is [1, K]; B is a preset threshold; $t_1$ is a timing advance of a base station 1 corresponding to a virtual user 1; $t_2$ is a timing advance of a base station 2 corresponding to a virtual user 2; and $t_K$ is a timing advance of the base station K corresponding to the virtual user K.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when $\max(t_1, t_2, \ldots, t_K) - \min(t_1, t_2, \ldots, t_K) < B$, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signals is effectively improved.

Further, in another embodiment of the present invention, based on the foregoing embodiments, the method may further include:

obtaining an uplink time-frequency resource and a modulation and coding scheme corresponding to each of the K virtual users.

Then the processing, according to base station precode and user precode corresponding to each virtual user, a split baseband signal corresponding to each user, and obtaining an uplink signal corresponding to each virtual user includes:

processing, according to the base station precode, the user precode, the uplink time-frequency resource, and the modulation and coding scheme corresponding to each virtual user, the split baseband signal corresponding to each user, and obtaining the uplink signal corresponding to each virtual user.

Figure 6:
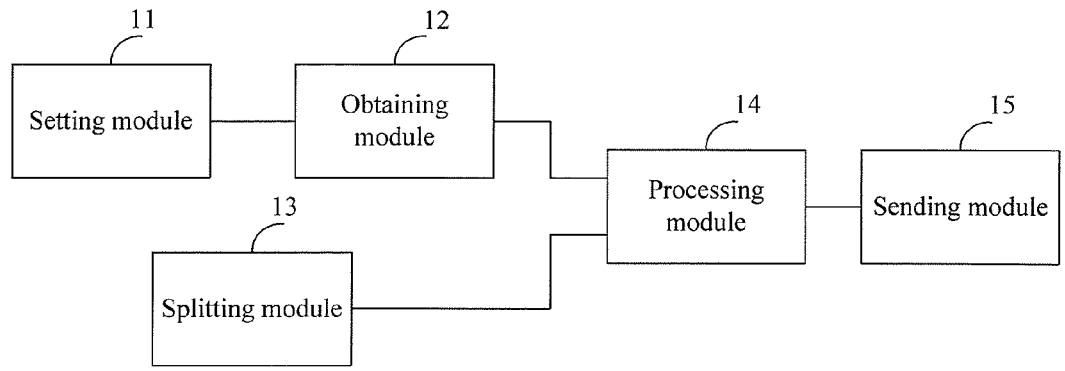
FIG. 6 is a schematic structural diagram of a signal transmission device according to an embodiment of the present invention.

FIG. 6 is a schematic structural diagram of a signal transmission device according to an embodiment of the present invention. As shown in FIG. 6, a user terminal in this embodiment includes: a setting module 11, an obtaining module 12, a splitting module 13, a processing module 14, and a sending module 15, where the setting module 11 is configured to set K virtual users, where each virtual user is associated with one base station; the obtaining module 12 is configured to obtain base station precode and user precode corresponding to each of the K virtual users; the splitting module 13 is configured to split a baseband signal to the K virtual users, and obtain a split baseband signal corresponding to each of the K virtual users; the processing module 14 is configured to process, according to the base station precode and the user precode corresponding to each virtual user, the split baseband signal corresponding to each virtual user, and obtain an uplink signal corresponding to each virtual user; and the sending module 15 is configured to obtain timing advances $\{t_1, t_2, \ldots, t_K\}$ of base stations corresponding to the K virtual users, and when max $(t_1, t_2, \ldots, t_K) - \min(t_1, t_2, \ldots, t_K) < B$, transmit, through an antenna, the uplink signal corresponding to the virtual user to the base station corresponding to each virtual user, where K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K.

The user terminal in this embodiment may execute the technical solution of the method embodiment shown in FIG. 1. Its implementation principle is similar, and is not repeated herein.

In this embodiment, K virtual users are set, where each virtual user is associated with one base station; base station precode and user precode corresponding to each of the K virtual users are obtained; a baseband signal is split to the K virtual users, and a split baseband signal corresponding to each of the K virtual users is obtained; the split baseband signal corresponding to each virtual user is processed according to the base station precode and the user precode corresponding to each virtual user, and an uplink signal corresponding to each virtual user is obtained; and timing advances $\{t_1, t_2, \ldots, t_K\}$ of base stations corresponding to the K virtual users are obtained, and when $\max(t_1, t_2, \ldots, t_K) - \min(t_1, t_2, \ldots, t_K) < B$, the uplink signal corresponding to the virtual user is transmitted, through an antenna, to the base station corresponding to each virtual user, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Figure 7:
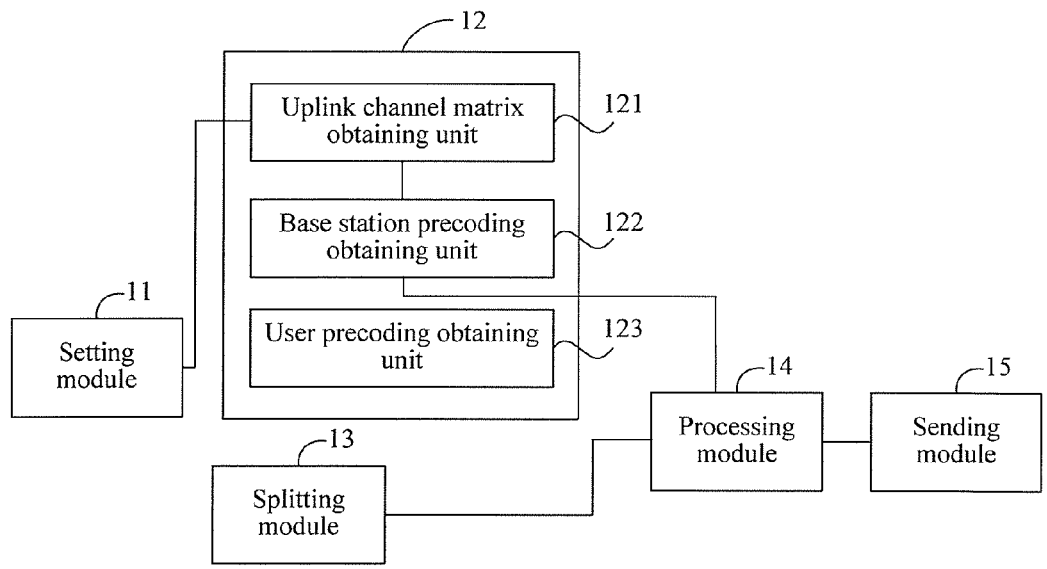
FIG. 7 is a schematic structural diagram of a signal transmission device according to another embodiment of the present invention.

FIG. 7 is a schematic structural diagram of a signal processing device according to another embodiment of the present invention. In this embodiment, a technical solution of the present invention is described in detail by using that a base station adopts a duplex mode of TDD and a user terminal also adopts a duplex mode of TDD as an example. As shown in FIG. 7, based on the embodiment shown in FIG. 6, the obtaining module 12 includes an uplink channel matrix obtaining unit 121 and a base station precode obtaining unit 122, where the uplink channel matrix obtaining unit 121 is configured to obtain an uplink channel matrix $H_i$ from the user terminal to a base station i; and the base station precode obtaining unit 122 is configured to adopt, according to other uplink channel matrices except for $H_i$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T - n_i$ column vectors of V to base station precode $P_i$ corresponding to a virtual user i.

i is an integer, and a value range of i is [1, K]; $n_i$ is the number of elements greater than a preset value on a diagonal line of D; $N_T$ is the number of antennas of the user terminal; D is a second matrix after singular value decomposition is performed; and V' is a first unitary matrix after the singular value decomposition is performed.

In addition, preferably, the uplink channel matrix obtaining unit 121 is specifically configured to estimate the uplink channel matrix $H_i$ from the user terminal to the base station i according to a downlink pilot transmitted by the base station i.

In this embodiment, because in the duplex mode of the TDD, the uplink and the downlink use the same frequency spectrum, a downlink channel is an uplink channel, that is, the user terminal may estimate an uplink channel matrix from the user terminal to each base station through a downlink pilot transmitted to each base station, so as to obtain uplink channel matrices $\{H_1, H_2, \ldots, H_K\}$ from the user terminal to K base stations.

More preferably, the splitting module 13 is further configured to split an uplink pilot to the K virtual users.

The processing module 14 is further configured to perform, according to the base station precode $P_i$ corresponding to the virtual user i, precoding on a split uplink pilot corresponding to the virtual user i.

The sending module 15 is further configured to send, through the antenna, the split uplink pilot obtained after the precoding to the base station i corresponding to the virtual user i, so that the base station i measures an equivalent uplink channel $H_i P_i$ of the virtual user i and the base station i according to the split uplink pilot obtained after the precoding, and send, to the user terminal, user precode $Q_i$ that is corresponding to the virtual user i and is obtained according to the equivalent uplink channel $H_i P_i$.

The obtaining module 12 further includes a user precode obtaining unit 123, configured to enable the virtual user i to receive the user precode $Q_i$ sent by the base station i.

The user terminal in this embodiment may execute a technical solution of the method embodiment shown in FIG. 2. Its implementation principle is similar, and is not repeated herein.

Figure 8:
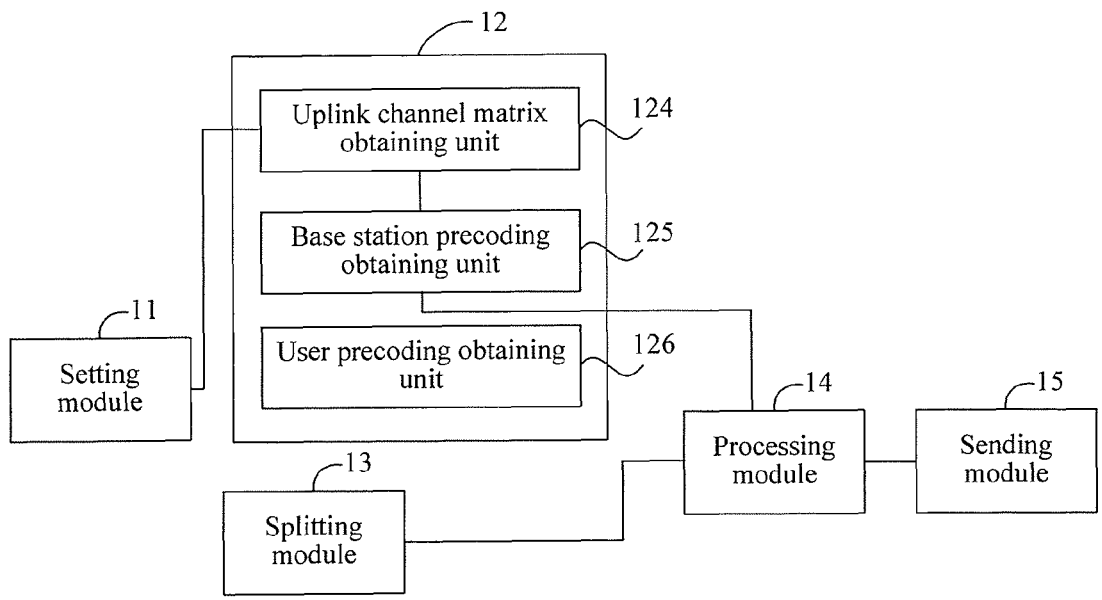
FIG. 8 is a schematic structural diagram of a signal transmission device according to still another embodiment of the present invention.

FIG. 8 is a schematic structural diagram of a signal processing device according to still another embodiment of the present invention. In this embodiment, a technical solution of the present invention is described in detail by using that a user terminal is located in a service range of an FDD macro base station as an example. As shown in FIG. 8, based on the embodiment shown in FIG. 6, the setting module 11 is further configured to set initial base station precode $P_i'$ corresponding to a virtual user i; the splitting module 13 is further configured to split an uplink pilot to the K virtual users; the processing module 14 is further configured to perform, according to the base station precode $P_i'$ corresponding to the virtual user i, precoding on a split uplink pilot corresponding to the virtual user i, and send, through the antenna, the split uplink pilot obtained after the precoding to K base stations, so that each base station obtains an equivalent uplink channel of the virtual user i and the base station according to the split uplink pilot obtained after the precoding.

The obtaining module 12 includes an uplink channel matrix obtaining unit 124 and a base station precode obtaining unit 125, where the uplink channel matrix obtaining unit 124 is configured to receive the equivalent uplink channel of the virtual user i and the base station that is sent by each base station, so as to obtain equivalent uplink channels $\{H_1P_i', H_2P_i', \ldots, H_KP_i'\}$ of the virtual user i and the K base stations; and adopt, according to initial base station precode corresponding to each virtual user and the equivalent uplink channels $\{H_1P_i', H_2P_i', \ldots, H_KP_i'\}$ of the virtual user i and the K base stations, Formula $H_i=[H_iP_1', H_iP_2', \ldots, H_iP_K'][P_1', P_2', \ldots, P_K']^{-1}$ to obtain an uplink channel matrix $H_i$ from the user terminal to a base station i. The base station precode obtaining unit 125 is configured to adopt, for each virtual user according to other uplink channel matrices except for $H_i$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T-n_i$ column vectors of V to the base station precode $P_i$ corresponding to the virtual user i.

i is an integer, and a value range of i is [1, K]; $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

Preferably, the splitting module 13 is further configured to split the uplink pilot to the K virtual users.

The processing module 14 is further configured to perform, according to the base station precode $P_i$ corresponding to the virtual user i, the precoding on the split uplink pilot corresponding to the virtual user i.

The sending module 15 is further configured to send, through the antenna, the split uplink pilot obtained after the precoding to the base station i corresponding to the virtual user i, so that the base station i measures an equivalent uplink channel $H_iP_i$ of the virtual user i and the base station i according to the split uplink pilot obtained after the precoding, and sends, to the user terminal, user precode $Q_i$ that is corresponding to the virtual user i and is obtained according to the equivalent uplink channel $H_iP_i$.

The obtaining module 12 further includes a user precode obtaining unit 126, configured to enable the virtual user i to receive the user precode $Q_i$ sent by the base station i.

The user terminal in this embodiment may execute a technical solution of the method embodiment shown in FIG. 3. Its implementation principle is similar, and is not repeated herein.

Figure 9:
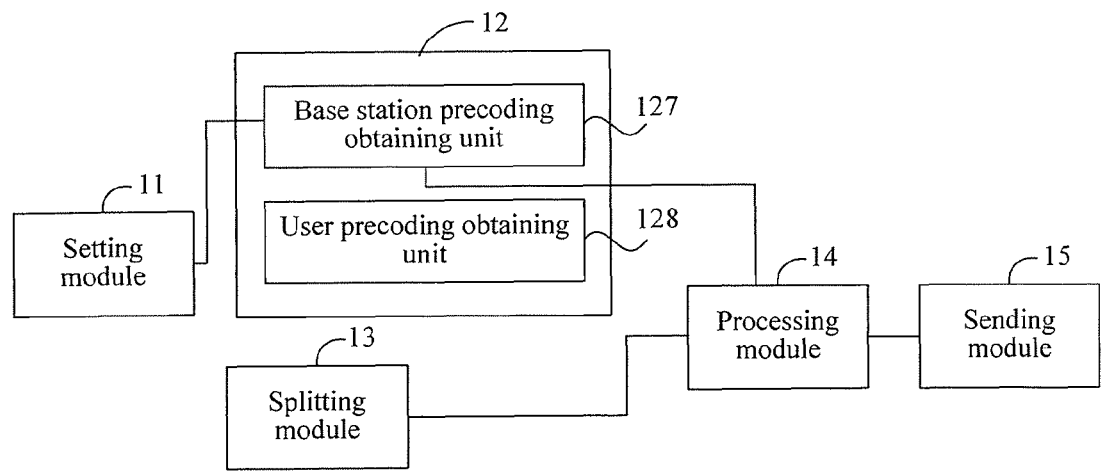
FIG. 9 is a schematic structural diagram of a signal transmission device according to yet another embodiment of the present invention.

FIG. 9 is a schematic structural diagram of a signal processing device according to yet another embodiment of the present invention. In this embodiment, a technical solution of the present invention is described in detail by using that a user terminal is located in a service range of an FDD macro base station as an example. As shown in FIG. 9, based on the embodiment shown in FIG. 6, the obtaining module 12 includes a base station precode obtaining unit 127, configured to use an identity matrix to set base station precode $P_i$ corresponding to a virtual user i.

In addition, preferably, the splitting module 13 is further configured to split an uplink pilot to the K virtual users.

The processing module 14 is further configured to perform precoding on a split uplink pilot according to the base station precode $P_i'$ corresponding to the virtual user i.

The sending module 15 is further configured to send the split uplink pilot obtained after the precoding to a base station i through the antenna, so that the base station i measures an uplink channel matrix from the base station i to the user terminal according to the split uplink pilot obtained after the precoding, and feeds back the uplink channel matrix to the user terminal.

The obtaining module 12 further includes a user precode obtaining unit 128, configured to receive uplink channel matrices $\{H_1, H_2, \ldots, H_K\}$ fed back by K base stations; adopt, according to other uplink channel matrices except for $H_i$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T-n_i$ column vectors of V to user precode $Q_i$ corresponding to the virtual user i.

i is an integer, and a value range of i is [1, K]; $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

The user terminal in this embodiment may execute a technical solution of the method embodiment shown in FIG. 4. Its implementation principle is similar, and is not repeated herein.

Figure 10:
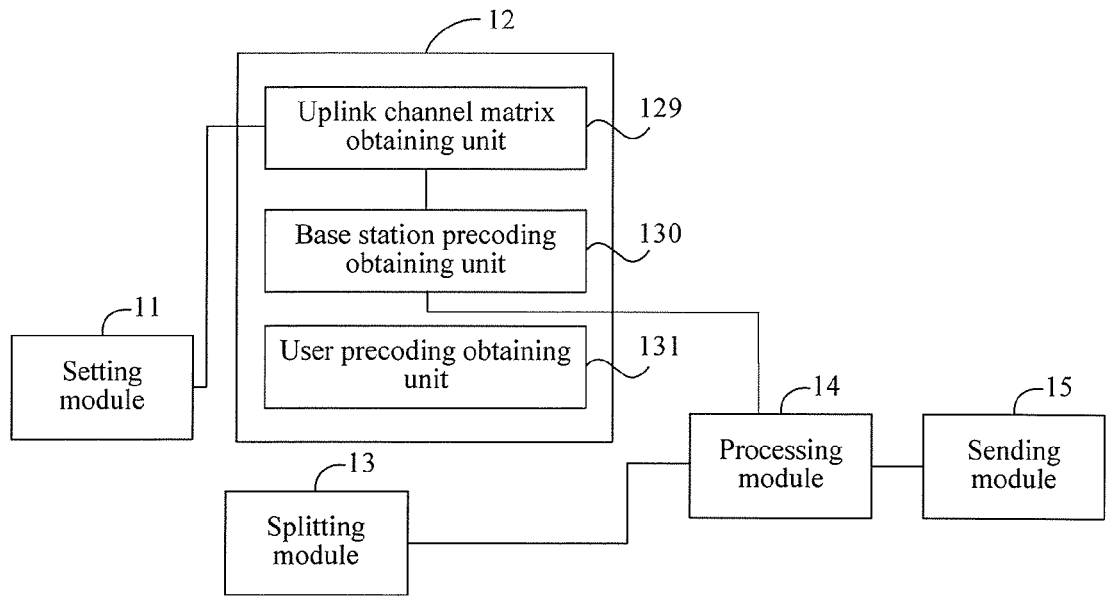
FIG. 10 is a schematic structural diagram of a signal transmission device according to yet another embodiment of the present invention.

FIG. 10 is a schematic structural diagram of a signal processing device according to yet another embodiment of the present invention. In this embodiment, a technical solution of the present invention is described in detail by using that a user terminal is located in a service range of an FDD micro base station as an example. As shown in FIG. 10, based on the embodiment shown in FIG. 6, the obtaining module 12 includes an uplink channel matrix obtaining unit 129 and a base station precode obtaining unit 130, where the uplink channel matrix obtaining unit 129 is configured to measure, in a preset time window, an average value $\{F_1, F_2, \ldots, F_K\}$ of downlink channels from K base stations to the user terminal; and perform transpose on an average value $F_i$ of a downlink channel from a base station i to the user terminal, and use the average value of the downlink channel after the transpose is performed as an uplink channel matrix $H_i$ from the user terminal to the base station i. The base station precode obtaining unit 130 is configured to adopt, according to other uplink channel matrices except for $H_i$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T - n_i$ column vectors of V to base station precode $P_i$ corresponding to a virtual user i.

$n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

In addition, preferably, the splitting module 13 is further configured to split an uplink pilot to the K virtual users.

The processing module 14 is further configured to perform, according to the base station precode $P_i$ corresponding to the virtual user i, precoding on a split uplink pilot corresponding to the virtual user i.

The sending module 15 is further configured to send, through the antenna, the split uplink pilot obtained after the precoding to the base station i corresponding to the virtual user i, so that the base station i measures an equivalent uplink channel $H_iP_i$ of the virtual user i and the base station i according to the split uplink pilot obtained after the precoding, and sends, to the user terminal, user precode $Q_i$ that is corresponding to the virtual user i and is obtained according to the equivalent uplink channel $H_iP_i$.

The obtaining module 12 further includes a user precode obtaining unit 131, configured to enable the virtual user i to receive the user precode $Q_i$ sent by the base station i.

The user terminal in this embodiment may execute a technical solution of the method embodiment shown in FIG. 5. Its implementation principle is similar, and is not repeated herein.

It also needs to be noted that, in another embodiment of a user terminal in the present invention, in the embodiment shown in any one of FIG. 6 to FIG. 10, the obtaining module 12 is further configured to obtain an uplink time-frequency resource and a modulation and coding scheme corresponding to each of the K virtual users.

The processing module 14 is specifically configured to process, according to the base station precode, the user precode, the uplink time-frequency resource, and the modulation and coding scheme corresponding to each virtual user, the split baseband signal corresponding to each user, and obtain the uplink signal corresponding to each virtual user.

The present invention further provides a user terminal, including a memory and a processor, where the memory is configured to store an instruction; and the processor is coupled to the memory and the processor is configured to execute the instruction stored in the memory, and the processor is configured to execute the signal transmission method in any one of the embodiments shown in FIG. 1 to FIG. 5. Its implementation principle is similar, and is not repeated herein.

Figure 11:
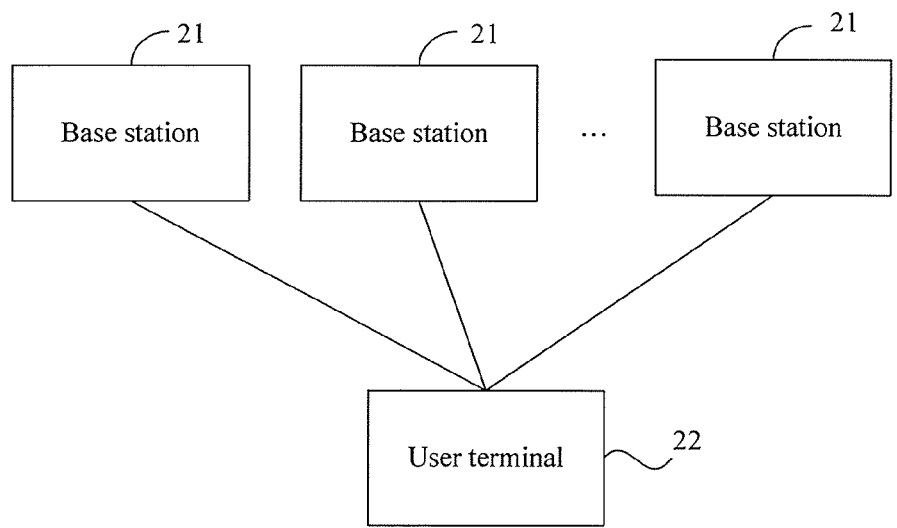
FIG. 11 is a schematic structural diagram of a signal transmission system according to an embodiment of the present invention.

FIG. 11 is a schematic structural diagram of a signal transmission system according to an embodiment of the present invention, where the signal transmission system includes multiple base stations 21 and a user terminal 22. Specifically, the base stations 21 are associated with one virtual user in the user terminal 22. The user terminal 22 may execute the technical solution in any one of the embodiments shown in FIG. 1 to FIG. 5, and may be the signal processing device shown in any one of FIG. 6 to FIG. 10. Its implementation principle is similar, and is not repeated herein.

Figure 12:
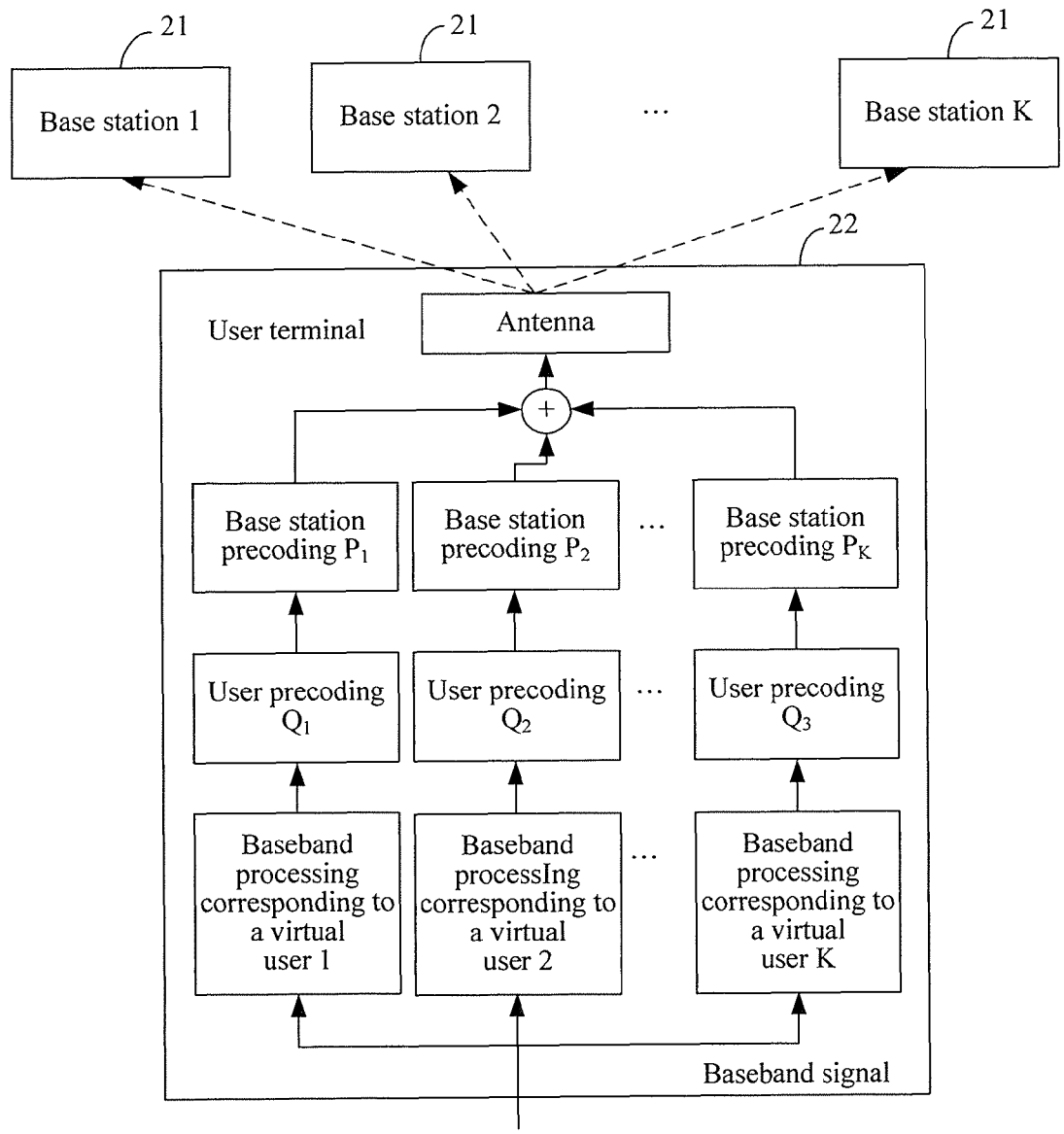
FIG. 12 is a schematic principle diagram of a signal transmission system according to another embodiment of the present invention.

In addition, preferably, FIG. 12 is a schematic principle diagram of a signal transmission system according to another embodiment of the present invention. As shown in FIG. 12, based on the embodiment shown in FIG. 11, for example, the number of the base stations 21 may specifically be K; and the user terminal 22 is specifically set with K virtual users, where each virtual user corresponds to one user precode and one base station precode.

In addition, a baseband signal is split to the K virtual users. A virtual user i performs baseband processing on a split baseband signal according to an uplink time-frequency resource and a modulation and coding scheme that are obtained; then obtains an uplink signal after performing, according to user precode $Q_i$ and base station precode $P_i$, precoding on the baseband signal on which the baseband processing has been performed; and when $\max(t_1, t_2, \ldots, t_K) - \min(t_1, t_2, \ldots, t_K) < B$, sends, through an antenna, the uplink signal to a base station i corresponding to the virtual user i, so that the user terminal transmits the same or different uplink signals to the same or different base stations simultaneously, it is ensured that interference between uplink signals of different virtual users is controllable, and furthermore, efficiency that the user terminal transmits an uplink signal is effectively improved.

Persons of ordinary skill in the art may understand that, all or a part of the steps of the foregoing method embodiments may be implemented by a program instructing relevant hardware. The foregoing program may be stored in a computer readable storage medium. When the program runs, the steps of the foregoing method embodiments are performed. The foregoing storage medium includes various mediums capable of storing program code, such as a ROM, a RAM, a magnetic disk, or an optical disc.

Finally, it should be noted that the foregoing embodiments are merely intended for describing the technical solutions of the present invention rather than limiting the present invention. Although the present invention is described in detail with reference to the foregoing embodiments, persons of ordinary skill in the art should understand that they may still make modifications to the technical solutions described in the foregoing embodiments, or make equivalent replacements to some or all technical features thereof; however, these modifications or replacements do not make the essence of corresponding technical solutions depart from the scope of the technical solutions in the embodiments of the present invention.

What is claimed is:

1. A signal transmission method, comprising:
    setting K virtual users, wherein each of the K virtual users is associated with one base station;
    obtaining base station precode and user precode corresponding to each of the K virtual users;
    splitting a baseband signal to the K virtual users, and obtaining a split baseband signal corresponding to each of the K virtual users;
    processing, according to the base station precode and the user precode corresponding to each of the K virtual users, the split baseband signal corresponding to each of the K virtual users, and obtaining an uplink signal corresponding to each of the K virtual users; and
    obtaining timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmitting, through antennas, the uplink signal corresponding to each of the K virtual users to the base station corresponding to each of the K virtual users;
    wherein K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station corresponding to a virtual user K.

2. The signal transmission method according to claim 1, wherein obtaining base station precode corresponding to each of the K virtual users comprises:
    obtaining an uplink channel matrix $H_i$ from a user terminal to a base station i, and obtaining uplink channel matrices $\{H_1, H_2, \ldots, H_K\}$ of the user terminal to K base stations; and
    adopting, according to the uplink channel matrices $\{H_1, H_2, \ldots, H_K\}$, Formula $$\begin{bmatrix} H_1 \\ \vdots \\ H_{i-1} \\ H_{i+1} \\ \vdots \\ H_K \end{bmatrix} = UDV'$$

to obtain D and V'; and performing conjugate transpose on V' to obtain V, and setting a matrix formed by last $N_T - n_i$ column vectors of V to base station precode $P_i$ corresponding to a virtual user i;
    wherein i is an integer, and a value range of i is [1, K]; $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

V' is a first unitary matrix after the singular value decomposition is performed on $$\begin{bmatrix} H_1 \\ \vdots \\ H_{i-1} \\ H_{i+1} \\ \vdots \\ H_K \end{bmatrix},$$

and U is a unitary matrix after the singular value decomposition is performed on $$\begin{bmatrix} H_1 \\ \vdots \\ H_{i-1} \\ H_{i+1} \\ \vdots \\ H_K \end{bmatrix}.$$

3. The signal transmission method according to claim 2, wherein obtaining user precode corresponding to each of the K virtual users comprises:

splitting an uplink pilot to the K virtual users;
performing, according to the base station precode $P_i$ corresponding to the virtual user i, precoding on a split uplink pilot corresponding to the virtual user i, and sending, through the antennas, the split uplink pilot obtained after the precoding to the base station i corresponding to the virtual user i, so that the base station i measures an equivalent uplink channel $H_iP_i$ of the virtual user i and the base station i according to the split uplink pilot obtained after the precoding, and sends, to the user terminal, user precode $Q_i$ that is corresponding to the virtual user i and is obtained according to the equivalent uplink channel $H_iP_i$; and
receiving, by the virtual user i, the user precode $Q_i$ sent by the base station i.

4. The signal transmission method according to claim 2, wherein obtaining the uplink channel matrix $H_i$ from the user terminal to the base station i comprises:
estimating the uplink channel matrix $H_i$ from the user terminal to the base station i according to a downlink pilot transmitted by the base station i.

5. The signal transmission method according to claim 2, wherein obtaining the uplink channel matrix $H_i$ from the user terminal to the base station i comprises:
setting initial base station precode $P_i'$ corresponding to the virtual user i;
splitting an uplink pilot to the K virtual users;
performing, according to the base station precode $P_i'$ corresponding to the virtual user i, precoding on a split uplink pilot corresponding to the virtual user i, and sending the split uplink pilot obtained after the precoding to K base stations through the antennas, so that each base station obtains an equivalent uplink channel of the virtual user i and the base station according to the split uplink pilot obtained after the precoding;
receiving the equivalent uplink channel of the virtual user i and the base station that is sent by each base station, so as to obtain equivalent uplink channels $\{H_1P_i', H_2P_i', \ldots, H_KP_i'\}$ of the virtual user i and the K base stations; and
adopting, according to initial base station precode corresponding to each of the K virtual users and the equivalent uplink channels $\{H_1P_i', H_2P_i', \ldots, H_KP_i'\}$ of the virtual user i and the K base stations, Formula $H_i=[H_iP_1', H_iP_2', \ldots, H_iP_K'][P_1', P_2', \ldots, P_K']^{-1}$ to obtain the uplink channel matrix $H_i$ from the user terminal to the base station i.

6. The signal transmission method according to claim 2, wherein obtaining an uplink channel matrix $H_i$ from the user terminal to the base station i comprises:
measuring, in a preset time window, an average value $\{F_1, F_2, \ldots F_K\}$ of downlink channels from K base stations to the user terminal; and
performing transpose on an average value $F_i$ of a downlink channel from the base station i to the user terminal, and using the average value of the downlink channel after the transpose is performed as the uplink channel matrix $H_i$ from the user terminal to the base station i.

7. The signal transmission method according to claim 1, wherein obtaining base station precode corresponding to each of the K virtual users comprises:
using an identity matrix to set base station precode $P_i$ corresponding to a virtual user i, wherein i is an integer, and a value range of i is [1, K].

8. The signal transmission method according to claim 7, wherein obtaining user precode corresponding to each of the K virtual users comprises:
splitting an uplink pilot to the K virtual users;
performing precoding on a split uplink pilot according to the base station precode $P_i'$ corresponding to the virtual user i, and sending the split uplink pilot obtained after the precoding to a base station i through the antennas, so that the base station i measures an uplink channel matrix from the base station i to the user terminal according to the split uplink pilot obtained after the precoding, and feeds back the uplink channel matrix to the user terminal;
receiving uplink channel matrices $\{H_1, H_2, \ldots, H_K\}$ fed back by K base stations; and
adopting, according to the uplink channel matrices $\{H_1, H_2, \ldots, H_K\}$, Formula $$\begin{bmatrix} H_1 \\ \vdots \\ H_{i-1} \\ H_{i+1} \\ \vdots \\ H_K \end{bmatrix} = UDV'$$

to obtain D and V'; and performing conjugate transpose on V' to obtain V, and setting a matrix formed by last $N_T-n_i$ column vectors of V to user precode $Q_i$ corresponding to the virtual user i,
wherein $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

9. The signal transmission method according to claim 1, further comprising:
obtaining an uplink time-frequency resource and a modulation and coding scheme corresponding to each of the K virtual users; and
wherein processing, according to base station precode and user precode corresponding to each of the K virtual users, a split baseband signal corresponding to each of the K virtual users, and obtaining an uplink signal corresponding to each of the K virtual users comprises:
processing, according to the base station precode, the user precode, the uplink time-frequency resource, and the modulation and coding scheme corresponding to each of the K virtual users, the split baseband signal corresponding to each of the K virtual users, and obtaining the uplink signal corresponding to each of the K virtual users.

10. A signal transmission device, comprising:

a processor; and memory coupled to the processor comprising instructions that, when executed by the processor, cause the signal transmission device to:

set K virtual users, wherein each of the K virtual users is associated with one base station;

obtain base station precode and user precode corresponding to each of the K virtual users;

split a baseband signal to the K virtual users, and obtain a split baseband signal corresponding to each of the K virtual users;

process, according to the base station precode and the user precode corresponding to each of the K virtual users, the split baseband signal corresponding to each of the K virtual users, and obtain an uplink signal corresponding to each of the K virtual users; and obtain timing advances $\{t_1, t_2, \ldots, t_K\}$ of base stations corresponding to the K virtual users, and when $\max(t_1, t_2, \ldots, t_K) - \min(t_1, t_2, \ldots, t_K) < B$, transmit, through antennas, the uplink signal corresponding to the virtual user to the base station corresponding to each virtual user;

wherein K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K.

11. The signal transmission device according to claim 10, further comprising instructions that, when executed by the processor, cause the signal transmission device to:

obtain an uplink channel matrix $H_i$ from a user terminal to a base station i, and obtain uplink channel matrices $\{H_1, H_2, \ldots, H_K\}$ of the user terminal to K base stations; and adopt, according to the uplink channel matrices $\{H_1, H_2, \ldots, H_K\}$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix faulted by last $N_T - n_i$ column vectors of V to base station precode $P_i$ corresponding to a virtual user i;

wherein i is an integer, and a value range of i is [1, K]; $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

V' is a first unitary matrix after the singular value decomposition is performed on $$\begin{bmatrix} H_1 \\ \vdots \\ H_{i-1} \\ H_{i+1} \\ \vdots \\ H_K \end{bmatrix},$$

and U is a unitary matrix after the singular value decomposition is performed on $$\begin{bmatrix} H_1 \\ \vdots \\ H_{i-1} \\ H_{i+1} \\ \vdots \\ H_K \end{bmatrix}.$$

12. The signal transmission device according to claim 11, further comprising instructions that, when executed by the processor, cause the signal transmission device to:

split an uplink pilot to the K virtual users;

perform, according to the base station precode $P_i$ corresponding to the virtual user i, precoding on a split uplink pilot corresponding to the virtual user i;

send, through the antennas, the split uplink pilot obtained after the precoding to the base station i corresponding to the virtual user i, so that the base station i measures an equivalent uplink channel $H_i P_i$ of the virtual user i and the base station i according to the split uplink pilot obtained after the precoding, and sends, to the user terminal, user precode $Q_i$ that is corresponding to the virtual user i and is obtained according to the equivalent uplink channel $H_i P_i$; and enable the virtual user i to receive the user precode $Q_i$ sent by the base station i.

13. The signal transmission device according to claim 11, further comprising instructions that, when executed by the processor, cause the signal transmission device to estimate the uplink channel matrix $H_i$ from the user terminal to the base station i according to a downlink pilot transmitted by the base station i.

14. The signal transmission device according to claim 11, further comprising instructions that, when executed by the processor, cause the signal transmission device to:

set initial base station precode $P_i'$ corresponding to the virtual user i;

split an uplink pilot to the K virtual users;

perform, according to the base station precode $P_i'$ corresponding to the virtual user i, precoding on a split uplink pilot corresponding to the virtual user i;

send the split uplink pilot obtained after the precoding to K base stations through the antennas, so that each base station obtains an equivalent uplink channel of the virtual user i and the base station according to the split uplink pilot obtained after the precoding; and receive the equivalent uplink channel of the virtual user i and the base station that is sent by each base station, so as to obtain equivalent uplink channels $\{H_1P_i', H_2P_i', \ldots, H_KP_i'\}$ of the virtual user i and the K base stations; and adopt, according to initial base station precode corresponding to the virtual user i and the equivalent uplink channels $\{H_1P_i', H_2P_i', \ldots, H_KP_i'\}$ of the virtual user i and the K base stations, Formula $H_i=[H_iP_1', H_iP_2', \ldots, H_iP_K'][P_1', P_2', \ldots, P_K']^{-1}$ to obtain the uplink channel matrix $H_i$ from the user terminal to the base station i.

15. The signal transmission device according to claim 11, further comprising instructions that, when executed by the processor, cause the signal transmission device to measure, in a preset time window, an average value $\{F_1, F_2, \ldots F_K\}$ of downlink channels from K base stations to the user terminal; and perform transpose on an average value $F_i$ of a downlink channel from the base station i to the user terminal, and use the average value of the downlink channel after the transpose is performed as the uplink channel matrix $H_i$ from the user terminal to the base station i.

16. The signal transmission device according to claim 10, further comprising instructions that, when executed by the processor, cause the signal transmission device to:
use an identity matrix to set base station precode $P_i$ corresponding to the virtual user i, wherein i is an integer, and a value range of i is [1, K].

17. The signal transmission device according to claim 16, further comprising instructions that, when executed by the processor, cause the signal transmission device to:
split an uplink pilot to the K virtual users;
perform precoding on a split uplink pilot according to the base station precode $P_i'$ corresponding to the virtual user i;
send the split uplink pilot obtained after the precoding to a base station i through the antennas, so that the base station i measures an uplink channel matrix from the base station i to the user terminal according to the split uplink pilot obtained after the precoding, and feeds back the uplink channel matrix to the user terminal; and
receive uplink channel matrices $\{H_1, H_2, \ldots, H_K\}$ fed back by K base stations; adopt, according to the uplink channel matrices $\{H_1, H_2, \ldots, H_K\}$, Formula $$\begin{bmatrix} H_1 \\ \vdots \\ H_{i-1} \\ H_{i+1} \\ \vdots \\ H_K \end{bmatrix} = UDV'$$

to obtain D and V'; and perform conjugate transpose on V' to obtain V, and set a matrix formed by last $N_T-n_i$ column vectors of V to user precode $Q_i$ corresponding to the virtual user i,
wherein $n_i$ is the number of elements greater than a preset value on a diagonal line of D; $N_T$ is the number of antennas of the user terminal; D is a second matrix after singular value decomposition is performed on $$\begin{bmatrix} H_1 \\ \vdots \\ H_{i-1} \\ H_{i+1} \\ \vdots \\ H_K \end{bmatrix};$$

and V' is a first unitary matrix after the singular value decomposition is performed on $$\begin{bmatrix} H_1 \\ \vdots \\ H_{i-1} \\ H_{i+1} \\ \vdots \\ H_K \end{bmatrix}.$$

18. The signal transmission device according to claim 10, further comprising instructions that, when executed by the processor, cause the signal transmission device to:
obtain an uplink time-frequency resource and a modulation and coding scheme corresponding to each of the K virtual users; and
process, according to the base station precode, the user precode, the uplink time-frequency resource, and the modulation and coding scheme corresponding to each of the K virtual users, the split baseband signal corresponding to each of the K virtual users, and obtain the uplink signal corresponding to each of the K virtual users.

19. A signal transmission system, comprising:
a user terminal comprising:
a processor; and
memory coupled to the processor comprising instructions that, when executed by the processor, cause the user terminal to:
set K virtual users, wherein each of the K virtual users is associated with one base station;
obtain base station precode and user precode corresponding to each of the K virtual users;
split a baseband signal to the K virtual users, and obtain a split baseband signal corresponding to each of the K virtual users;
process, according to the base station precode and the user precode corresponding to each of the K virtual users, the split baseband signal corresponding to each of the K virtual users, and obtain an uplink signal corresponding to each of the K virtual users; and
obtain timing advances $\{t_1, t_2, \ldots, t_K\}$ of base stations corresponding to the K virtual users, and when max $(t_1, t_2, \ldots, t_K)-\min(t_1, t_2, \ldots, t_K)<B$, transmit, through antennas, the uplink signal corresponding to the virtual user to the base station corresponding to each virtual user;
wherein K is an integer, and K is greater than or equal to 1; B is a preset threshold; $t_1$ is a timing advance of a base station 1 corresponding to a virtual user 1; $t_2$ is a timing advance of a base station 2 corresponding to a virtual user 2; and $t_K$ is a timing advance of a base station K corresponding to a virtual user K; and
a base station associated with a virtual user of the user terminal.

* * * * *